May 20, 1930. W. L. WEST 1,759,381
ELECTRICAL FLOAT FOR FISH LINES
Filed Sept. 10, 1928
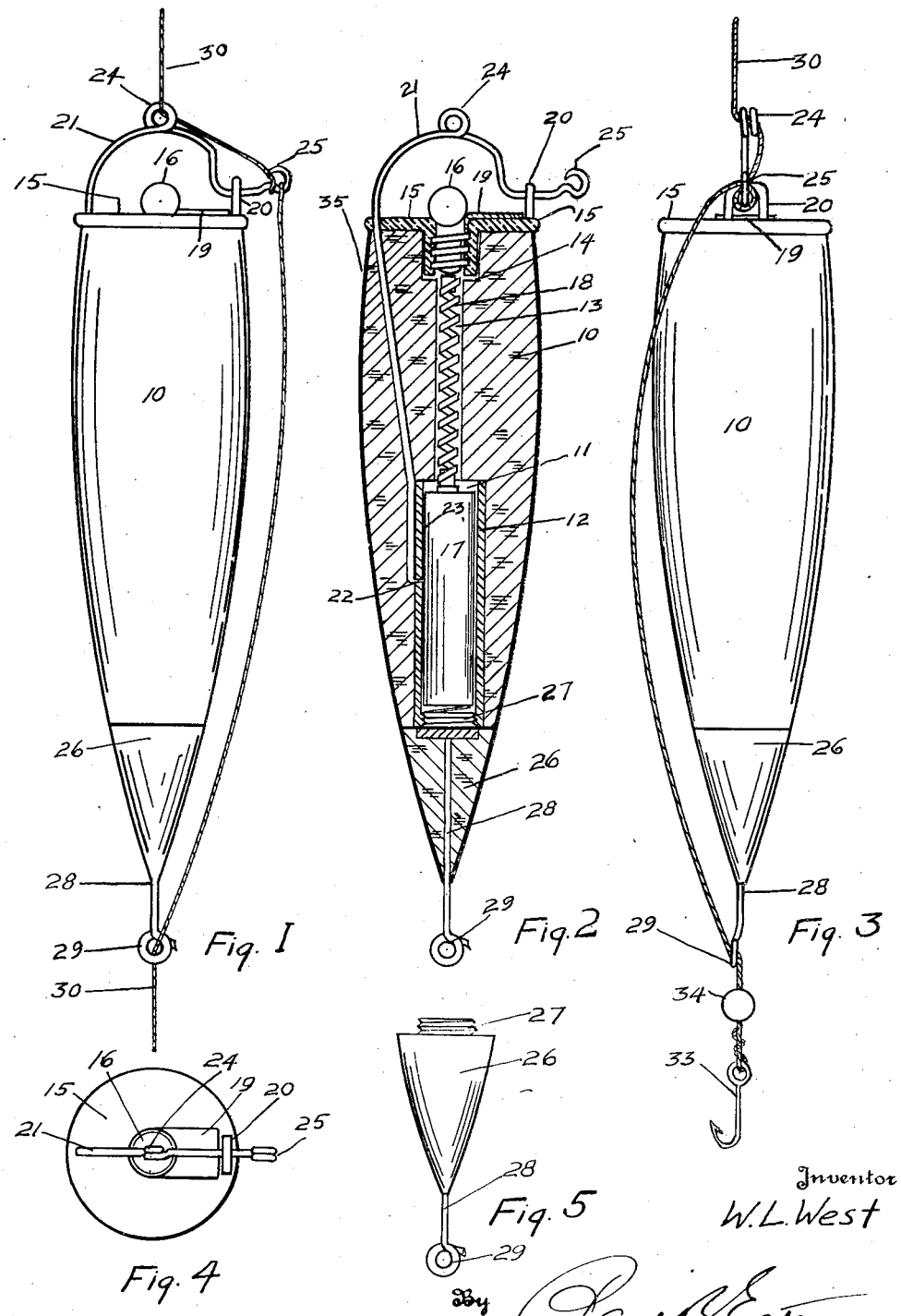
Inventor:
W. L. West
By
Attorney Patented May 20, 1930

1,759,381

UNITED STATES PATENT OFFICE

WILLIAM L. WEST, OF BELMONT, NORTH CAROLINA, ASSIGNOR OF ONE-HALF TO W. M. HALL, OF BELMONT, NORTH CAROLINA

ELECTRICAL FLOAT FOR FISHLINES

Application filed September 10, 1928. Serial No. 305,046.

My invention relates to fishing line floats and more particularly to a fish line float which is adapted to be used at night and which will visually indicate to the fisherman at night when the fish is biting at the hook. Said float being adapted with a dry cell storage battery and an electric light bulb and being so constructed as to cause a circuit to be closed when the fish bites at the hook to light the bulb to indicate to the fisherman that a fish is biting at the hook.

An object of my invention is to provide a buoyant fish line float having a circuit normally held in open position with the fish line and hook secured to said circuit, and which circuit is adapted to be closed temporarily by the bite of the fish at the hook so as to light an electric bulb contained in the float when said circuit is closed by fish biting at the hook.

Some of the objects of my invention having been stated, other objects will appear as the description proceeds when taken in connection with the accompanying drawings, in which:—

Figure 1 is a side elevation of my improved fish line float;

Figure 2 is a vertical cross section of my device;

Figure 3 is a side elevation looking from the left-hand side of Figure 1;

Figure 4 is a plan view of Figure 1;

Figure 5 is a detailed view of the stopper for the lower end of the float.

Referring more particularly to the drawings, the numeral 10 indicates the main body portion of my fish line float which has the enlarged bore 11 and the lower portion thereof in which the tubular casing 12 is adapted to be inserted, and in the upper portion of the member 10 is the restricted bore 13 which communicates with the enlarged bore 11, and in the upper end of the member 10 is an enlarged bore 14 in which the circular non-conducting member 15 is mounted which has a hole in its center communicating with the bore 13 in which is threadably secured the electric light bulb 16, and in the casing 12 is secured the dry cell storage battery 17 and a compression spring 18 presses against the lower portion of the electric light bulb 16 and the upper portion of the battery 17 forming a conductor therebetween, and secured in the opening in the member 15 and butting against the electric light bulb 16 is the member 19 which projects into close proximity with the staple 20.

A wire 21 is passed downwardly through the member 15, then through the member 10 and into the bore 11 and out through the bottom of said bore where it is led through a hole 22 in the tubular casing 12 and the portion 23 is bent upwardly inside said casing and the casing and wire are then pulled upwardly until they assume the position shown in Figure 2, after which the wire 21 is bent over the top of the member 15 and the loop 24 is formed over the bulb 16 and then the wire is passed through the staple 20 and the hook 25 is formed on the end thereof, said wire being of spring steel and being so positioned as not to touch the staple 20. The stopper 26 has the threaded nut 27 secured therein with the wire 28, which wire runs downwardly therefrom through the lower end of the stopper and has the eye 29 formed on the lower end thereof, so that when the device is assembled as shown in Figure 2 and the stopper 26 is screwed into position, the battery will be held in position so that when the hook 25 is pulled downwardly into contact with the member 19, a complete circuit will be formed between the battery and the light so as to cause the bulb to become illuminated.

A fish line 30 is adapted to be led from any suitable support through the eye 24 and wrapped around the hook portion 25, and the line is then led downwardly through the eye 29 in the lower portion of the wire 28, and is then led onto and connected to a fish hook 33, with a suitable weight 34 secured around the line, if such additional weight should be necessary.

If desired I can have the stopper made all of cork and omit the threaded portion, so that the same will be inserted as an ordinary bottle stopper.

After the device is completely assembled, I apply a coat of shellac or other water-proofing material over the entire outer surface of the float, except the upper surface of the member 19 which is left exposed to cause it to form a circuit. This water-proofing, as stated, may be of shellac, paraffin, or paraffin covered by shellac and is indicated by the numeral 35.

It is thus seen that I have provided a fishing line float in which the batteries can be quickly removed by removing the stopper portion 26, one which is water-proof and which will quickly indicate when a fish is biting at the hook, for the reason that when a downward pull is exerted on the hook it will slide through the hook 29 and being secured to the hook portion 25 will pull the wire 21 downwardly until it forms contact with the member 19 and thus compels the electric circuit to illuminate the light 16.

In the drawings and specification I have set forth a preferred embodiment of my invention, and although specific terms are employed, they are used in a generic and descriptive sense only and not for purposes of limitation, the scope of the invention being set forth in the appended claims.

I claim:

1. In a fish line float, the combination with a float body, a vertically disposed bore in the lower portion of the float, a bore of smaller diameter than the first bore, and being vertically disposed in the upper portion of the float and communicating with the first named bore, an enlarged bore in the upper end of the float and being in communication with the second named bore, an electric bulb mounted in the enlarged bore, a contact member extending from the bulb to a point near the outer periphery of the float, a spring wire member mounted in the float and being held in place above the bulb by means of a staple, means on the wire for engaging a fish line, a cylindrical casing mounted in the first named bore and being adapted to contain a battery, a hole in the casing thru which the lower end of said wire is adapted to pass and press against the side of the battery, a compression spring extending between the upper end of the battery and the lower end of the bulb, a stopper for the lower end of the first named bore, and means on the lower end of the stopper for slidably holding the fish line.

2. In a fish line float, the combination of a buoyant member, a vertically disposed bore extending entirely thru the buoyant member, an insulating top secured on the buoyant member, a hole in the central portion of the top and being adapted to receive an electric bulb, a battery mounted in the lower portion of the bore, a casing surrounding the battery, a coiled spring mounted between the battery and the bulb, a stopper in the lower end of the bore, a hook secured to the lower end of the stopper, a wire leading from the side of the battery, thru the casing, upwardly thru the buoyant member, over the bulb, and downwardly near the opposite side of the buoyant member, a staple secured in the buoyant member thru which the wire is led, an eye in the wire being located above the bulb, a contact member abutting against the bulb and extending to a point near the staple and beneath the wire, and a fish line adapted to be passed thru the eye above the bulb, then secured to the free end of the wire and then passed downwardly thru the hook in the lower end of the stopper, and having a fish hook secured to the lower end of said line, whereby a downward pull on the line will cause contact between the wire and the contact member.

In testimony whereof I affix my signature.
WILLIAM L. WEST.